United States Patent [19]

Asaoka

[11] 3,894,248

[45] July 8, 1975

[54] DYNAMIC SHIFT REGISTER UTILIZING MINORITY CARRIER STORAGE EFFECT OF SEMICONDUCTOR DEVICE

[75] Inventor: Takashi Asaoka, Tokyo, Japan

[73] Assignee: Nippon Telegraph and Telephone Public Corporation, Tokyo, Japan

[22] Filed: Sept. 17, 1973

[21] Appl. No.: 397,839

Related U.S. Application Data

[63] Continuation of Ser. No. 198,286, Nov. 12, 1971, abandoned.

[30] Foreign Application Priority Data

Aug. 11, 1971 Japan ................................ 46-60261

[52] U.S. Cl. ............. 307/211 R; 307/224; 307/300; 307/319

[51] Int. Cl. ....................... G11c 11/36; G11c 11/40

[58] Field of Search ........ 307/221 R, 224, 280, 281, 307/300, 319

[56] References Cited

UNITED STATES PATENTS 3,641,363 2/1972 Krause ........................... 307/300 X

*Primary Examiner*—John Zazworsky

*Attorney, Agent, or Firm*—Burgess, Ryan and Wayne

[57] ABSTRACT

In each of a plurality of unit circuits, two semiconductor devices are cascade-connected to a pair of first and second feeder lines to which are applied the voltage alternating between a first and second discrete level in a complementary manner with said first and second semiconductor devices being connected to said first and second feeder lines respectively. When the first voltage level is applied to the first feeder line while the second voltage level is applied to the second feeder line, current flows across the collector junction of the first semiconductor device to store minority carriers therein. When the second voltage level is applied to the first feeder line while the first voltage level is applied to the second feeder line, current which is controlled depending upon whether the minority carriers are stored in the first semiconductor device or not flows across the collector junction of the second semiconductor device, thereby shifting the storage of minority carriers from the first to the second semiconductor device. When the first voltage level is again applied to the first feeder line while the second voltage level is applied to the second feeder line, the minority carriers stored in the second semiconductor device is shifted to the first semiconductor device in the next unit circuit. In like manner, the information which is represented by the stored minority carriers may be shifted from one unit circuit to the next.

11 Claims, 10 Drawing Figures

DYNAMIC SHIFT REGISTER UTILIZING MINORITY CARRIER STORAGE EFFECT OF SEMICONDUCTOR DEVICE

This is a continuation of application Ser. No. 198,286, filed Nov. 12, 1971, and now abandoned.

BACKGROUND OF THE INVENTION

The present invention relates to generally a dynamic shift register and more particularly a dynamic shift register of the type utilizing the minority carrier storage effect of semiconductor device.

Dynamic shift registers finds wide applications in electronic computers, electronic exchangers and other fields not only as the scanning type storage devices in which the information stored is shifted form one unit circuit to the next but also as the scanning type driving devices for sequentially driving a plurality of circuits or lines. In the conventional dynamic shift registers, a plurality of storage elements equal in number to a desired stages or digit positions, each of which comprises more than six component parts such as for example bipolar transistors or MOS transistors are generally cascade-connected. Therefore in the conventional dynamic shift registers, the packaging density per storage element is limited so that even in case of the integrated dynamic shift register circuits, the miniaturization beyond a certain limit is impossible.

To overcome this problem, U.S. Pat. No. 3356860 and French Pat. No. 1,166,511 disclosed the dynamic shift registers in which a number of component parts used in each unit circuit which corresponds to each digit position is minimized.

According to said U.S. Pat. No. 3356860, a number of component parts used in each of storage elements for each digit position comprises fundamentally four transistors. Of these four transistors, two first and second transistors for storage of minority carriers have their collectors connected to a first and second feeder line. The emitter of the first transistor is connected to the base of the second transistor through the base-emitter junction of the third transistor which functions as an emitter-follower, and the emitter of the second transistor is also connected to the output terminal of the storage element or the base of the first transistor in the next storage element through the base-emitter junction of the fourth transistor in the first storage element which functions as an emitter-follower too. The base of the first transistor in the first storage element is used as an input terminal connected to the output terminal of the preceding storage element. The collectors of the third and fourth transistors are connected to a third feeder line which is supplied with a constant voltage. The voltage alternating between a first and second discrete levels is applied to the first and second feeder lines in a complementary manner. The information, which has been applied to the input terminal of the storage element corresponding to the least significant digit position and which is represented by the storage of minority carriers, is shifted from the first to the second transistors in the first storage element, from the second transistor in the first storage element to the first transistor in the next storage element and so on, as the levels of the voltage applied to the first and second feeder lines are varied.

However, dynamic shift register of the type described above still requires four component parts in each storage element and three feeder lines as a whole so that the reduction in manufacturing cost and packaging density is of course limited. This is true for the integrated circuit version of this dynamic shift register. Furthermore two emitter-follower transistors are used in each storage element or stage for current amplification so that the frequency of the voltage for causing the shift operation of the dynamic shift register is limited to a relatively low level. That is, the frequency is about several times the lifetime of minority carrier in a transistor so that the high-speed operation becomes impossible.

In the dynamic shift register of the type disclosed in the French Pat. No. 1,166,511, each of storage elements comprises six component parts, that is two transistors, two diodes and two resistors. The first and second transistors for storing the minority carriers have their collectors connected to a first and second feeder lines respectively. The emitters of the first and second transistors are connected to a ground line or third feeder line through the first and second resistors respectively. The emitter of the first transistor is connected to the base of the second transistor through the first diode while the emitter of the second transistor is connected to the output terminal or the base of the first transistor in the next storage element through the second diode in the first storage element. The base of the first transistor is used as the input terminal to be connected to the output terminal of the preceding storage element. The mode of operation of this dynamic shift register is substantially similar to that of the shift register of the above U.S. Pat. No. 3356860. However, in this dynamic shift register, each storage element or unit circuit requires six component parts and three feeder lines as described above, so that the reduction in number of component parts and packaging density is of course limited. Therefore, the manufacturing cost of the integrated circuit versions of the dynamic shift registers cannot be reduced beyond a certain limit. Furthermore, each stage uses the two resistors in order to adjust the discharge of the stored minority-carrier charges so that a dynamic shift register capable of operating at high speed may be designed, utilizing a power source having a high frequency. However due to the production variation of the resistors and the discharge of the stored minority carrier charges with the register, a range over which the frequency of the power source may be varied is limited.

As described above in the prior art dynamic shift registers there is a limit in reduction of a number of component parts per storage element or unit circuit, and there must be provided three feeder lines. Therefore the packaging density of the integrated circuit cannot be reduced beyond a certain limit, and the reduction in manufacturing cost is also limited.

In case of the integrated circuits, a number of component parts to be integrated into a circuit is limited from the standpoint of economy. Furthermore the greater the number of component parts, the less the storage capacity of the integrated circuit becomes. Therefore there has been a defect in the prior art in providing an integrated circuit of a dynamic shift register having a greater capacity.

One of the object of the present invention is therefore to provide a dynamic shift register in which each storage element or unit circuit constituting a digit stage comprises a minimum number of component parts and feeder lines.

Another object of the present invention is to provide a dynamic shift register utilizing the minority carrier storage effect in the collector junction of a transistor so that the temporary storage action may be dependent of the presence or absence of stored minority carriers in a transistor and that by utilizing the transistor current which is controlled by the stored minority carriers, the shift or transfer of the stored minority carriers from one transistor to the next may be effected without impairing the minority carrier storage effect.

According to one embodiment of the present invention, each storage element or unit circuit constituting each stage or digit position comprises two transistors and two feeder lines. The collector of the first transistor in each storage element or unit circuit is connected to the first feeder line, and the emitter thereof is connected to the base of the second transistor in the same storage element. The collector of the second transistor is connected to the second feeder line. The base of the first transistor is used as an input terminal for reception of information from the preceding storage element or stage, and the emitter of the second transistor is used as an output terminal of this storage element to be connected to the input terminal of the next storage element or stage. A voltage alternating between a first and second discrete levels is applied to the first and second feeder lines in a complementary manner. That is, when the voltage applied to the first feeder line is at the first level, the voltage of the second feeder line is at the second level while when the voltage applied to the first feeder line is at the second level, the voltage of the second feeder line is at the first level. When the first feeder line is supplied with the first level voltage while the second feeder line is supplied with the second level voltage, the information applied to the base of the first transistor in the first storage element or stage is stored as the minority carriers stored in the first transistor. When the voltage levels of the first and second feeder lines are reversed, the minority carriers stored in the first transistor are shifted into the second transistor so that the information is now stored in the second transistor. When the voltage levels of the feeder lines are reversed again, the minority carrier charges stored in the second transistor are shifted into the first transistor in the next storage element or stage. In the similar manner, the information may be shifted from the first transistor to the second transistor in the same storage element or stage, or from the second transistor in the preceding storage element or stage to the first transistor in the next storage element or stage. Thus the information may be shifted from one stage to the next in the dynamic shift register. According to this embodiment, each storage element or stage comprises only two component parts and a pair of feeder lines. Therefore the integrated circuit version of this dynamic shift register may have a greater capacity hitherto unattained by the prior art integrated circuits.

When it is desired to use the dynamic shift register of this embodiment as a scanning type driving device in which a greater driving current is not required, the emitters of the first and second transistors in the same storage element or stage may be connected directly to the external circuits. When a greater driving current is described, a third and fourth transistors are inserted between the first and second transistors in the same storage element or stage and between the second transistor in the said same storage element or stage and the first transistor in the next storage element or stage respectively, and are also connected to the external circuits respectively.

According to another embodiment of the present invention, the second transistor of the two transistors in each storage element or unit is replaced by two diodes. The emitter of the first transistor is connected to the anodes of the first and second diodes, and the cathode of the first diode is connected to the second feeder line while the cathode of the second diode is used as the output terminal.

The above and other objects, features and advantages of the present invention will become more apparent from the description of the preferred embodiments thereof taken in conjunction with the accompanying drawings and in comparison with said two prior art dynamic shift registers.

DESCRIPTION OF THE PREFERRED EMBODIMENTS

Prior Art

Figure 1:
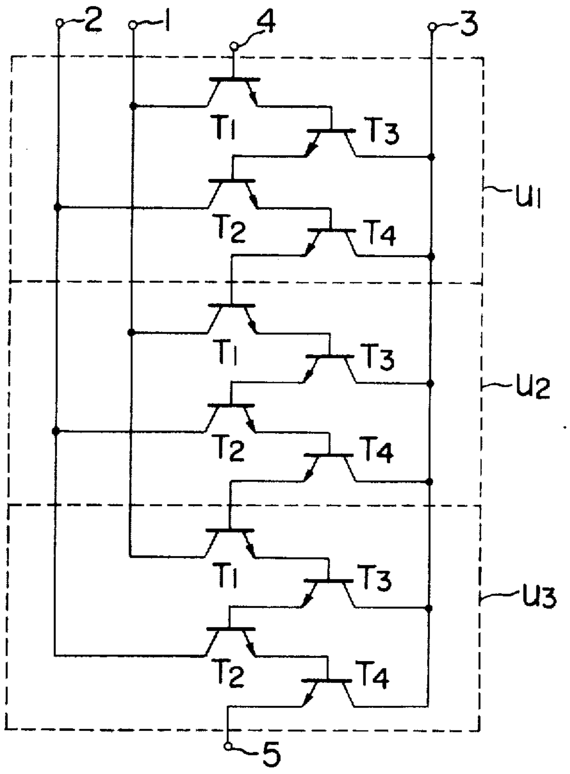
FIG. 1 PRIOR ART
FIGS. 1 and 2 are the circuit diagrams of said two prior art dynamic shift registers respectively.

In FIG. 1 is illustrated a dynamic shift register in accordance with said U.S. Pat. with each of unit or digit circuits $U_1$, $U_2$ and $U_3$ comprising four NPN transistors $T_1$, $T_2$, $T_3$ and $T_4$. For simplicity the dynamic shift register is shown as comprising the three unit circuits $U_1$, $U_2$ and $U_3$ connected to three feeder lines 1, 2 and 3. The zero and positive voltages are periodically supplied on the feeder lines 1 and 2 in a complementary manner. That is, when the voltage on the feeder line 1 is zero, the positive voltage is supplied on the feeder line 2 while when the positive voltage is supplied on the feeder line 1, the zero voltage is supplied on the feeder line 2. A predetermined voltage is supplied on the feeder line 3. The collector terminals of the transistors $T_1$ and $T_2$ for storage of minority carriers are connected to the feeder lines 1 and 2 respectively; the emitter terminal of the transistor $T_1$ is connected to the base of the transistor $T_2$ through the transistor $T_3$ which is an emitter-follower transistor; and the emitter terminal of the transistor $T_2$ is connected to the base of the transistor $T_1$ in the next digit through the transistor $T_4$ which is also an emitter-follower transistor. The collector terminals of the transistors $T_3$ and $T_4$ are connected to the feeder lines 3. The base of the transistor $T_1$ in the first unit circuit $U_1$ which constitutes the first digit of the dynamic shift register is the input terminal 4, and the emitter of the transistor $T_4$ in the third digit unit circuit $U_3$ is the output terminal 5.

Next the mode of operation of the dynamic shift register of the type described above will be briefly described. When the positive input signal is applied to the input terminal 4, when the zero voltage is supplied on the feeder line 1 while the positive voltage is supplied on the feeder line 2, the current flows through the collector junction of the transistor $T_1$ in the unit circuit $U_1$ so that the minority carries are stored in the collector junction region. When the positive voltage is supplied on the feeder line 1 while the zero voltage is supplied on the feeder line 2, the current due to the minority carriers stored in the transistor $T_1$ in the unit circuit $U_1$ is amplified by the emitter-follower transistor $T_3$ and flows into the collector junction of the transistor $T_2$ in the unit circuit $U_1$. Therefore, the minority carriers are stored in the collector junction region in the transistor $T_2$. When the zero voltage is supplied on the feeder line 1 while the positive voltage is supplied on the feeder line 2, the current due to the minority carriers stored in the transistor $T_2$ in the unit circuit $U_1$ is amplified by the transistor $T_4$ and flows into the collector junction of the transistor $T_1$ in the next unit circuit $U_2$. Therefore the minority carriers are also stored in the collector junction region of the transistor $T_1$ in the unit circuit $U_2$. In the similar manner to that described above, the input information is successively stored in the transistors $T_1$ and $T_2$ in the unit circuits $U_1$, $U_2$ and $U_3$ as the storage of the minority carriers. Thus, the input information can be shifted from one digit unit circuit to the next higher-significant-digit unit circuit.

Figure 2:
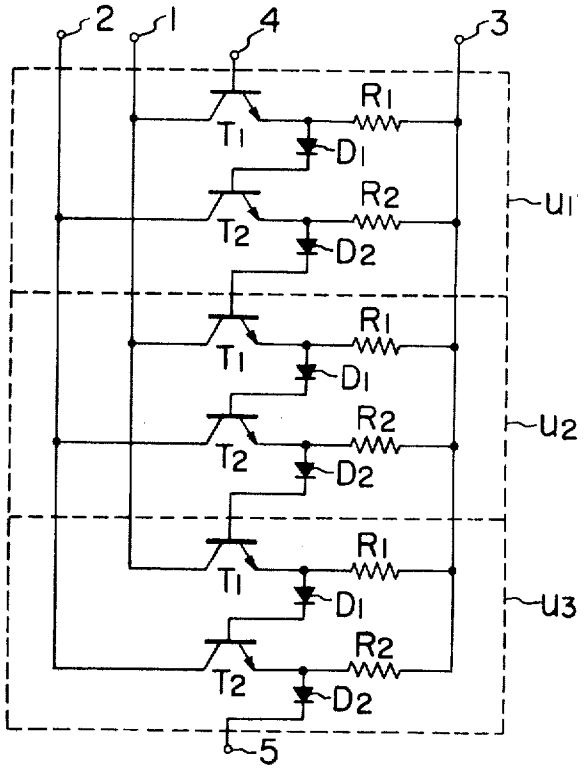
FIG. 2 PRIOR ART

In FIG. 2 is illustrated a dynamic shift register in accordance with said French patent with each of digit unit circuits $U_1$, $U_2$ and $U_3$ (only three circuits being shown for simplicity) comprising two transistors $T_1$ and $T_2$, two diodes $D_1$ and $D_2$ and two resistors $R_1$ and $R_2$. As is the case of the prior art dynamic shift register shown in FIG. 1, the zero and positive voltages are periodically, supplied on the feeder lines 1 and 2 in a complementary manner. That is, when the zero voltage is supplied on the feeder line 1, the positive rectangular waveform voltage is supplied on the feeder line 2, and vice versa. The feeder line 3 is the grounding line which is maintained at the ground potential. The collector terminals of the transistors $T_1$ and $T_2$ for storing the minority carriers are connected to the feeder lines 1 and 2 respectively, and the emitter terminals thereof are connected to the grounding line 3 through the resistors $R_1$ and $R_2$ respectively. The emitters of the transistors $T_1$ are connected to the bases of the transistors $T_2$ through the diodes $D_1$ in the same unit circuits $U_1$, $U_2$ and $U_3$, and the emitters of the transistors $T_2$ are connected through the diodes $D_2$ to the bases of the transistors $T_1$ in the next higher digit circuits $U_2$ and $U_3$ respectively. As in the case of the prior art dynamic shift register shown in FIG. 1, the input terminal is designated by 4 while the output terminal, by 5.

Next the mode of operation will be described briefly. When the input signal is applied to the input terminal 4 when the zero voltage is supplied on the feeder line 1 while the positive voltage is supplied on the feeder line 2, the current flows into the collector junction of the transistor $T_1$ in the unit circuit $U_1$ so that the minority carriers are stored in the transistor $T_1$. When the positive voltage is supplied on the feeder line 1 while the zero voltage is supplied on the feeder line 2, the current due to the minority carriers stored in the transistor $T_1$ in the circuit $U_1$ flows through the resistor $R_1$ so that the voltage drop across it occurs. Because of this voltage drop across the resistor $R_1$, the current flows into the collector junction of the transistor $T_2$ in the unit circuit $U_1$ through the diode $D_1$ so that the minority carriers are stored in the transistor $T_2$. When the zero voltage is supplied on the feeder line 1 while the positive voltage is supplied on the feeder line 2, the current due to the minority carriers stored in the transistor $T_2$ in the unit circuit $U_1$ flows through the resistor $R_2$. Therefore the current flows into the collector junction of the transistor $T_1$ in the next digit circuit $U_2$ through the diode $D_2$ in the unit circuit $U_1$ so that the minority carriers are also stored in the transistor $T_1$ in the unit circuit $U_2$. In this case, the diode $D_1$ interrupts the current flow so that no current is discharged through the resistor $R_1$. In the similar manner to that described above, the input information is stored in the transistors $T_1$ and $T_2$ in the unit circuits $U_1$, $U_2$ and $U_3$ as the storage of the minority carriers and is shifted successively to the next digit.

However, in the prior art dynamic shift registers of the type described, there is a problem of minimizing a number of component parts constituting each digit circuit, and there must be provided there feeder lines, so that the packaging density per unit circuit of the integral circuits is limited, and the cost reduction is also limited.

In integrated circuits, the number of component parts in an economically feasible integrated circuit is limited because of various reasons. That is, the greater the number of component parts in each memory cell, the smaller the capacity of an integrated memory circuit. Thus it is difficult for the prior art integrated memory devices to design to have a large memory capacity.

The Invention

Prior to the description of the preferred embodiments of the present invention, the minority carrier action in the transistor which underlies the principle of the present invention will be described with reference to FIG. 3.

Figure 3A:
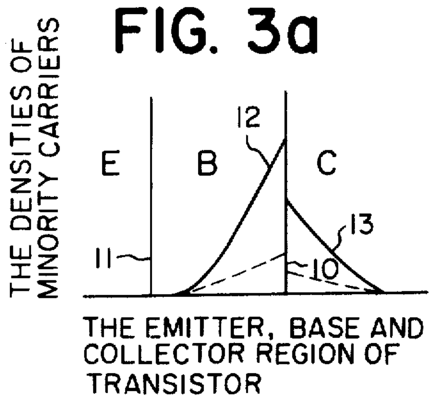
FIG. 3 is a diagram illustrating the density distribution of minority carriers in a transistor.
Figure 3B:
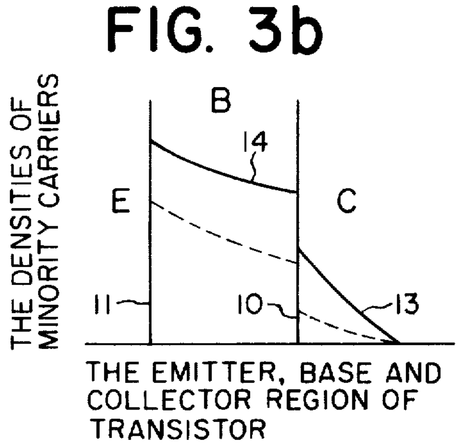

In FIGS. 3(*a*) and (*b*), the emitter, base and collector regions of a transistor are plotted against the abscissa while the densities of the minority carriers in these regions are plotted against the ordinate. When the collector junction 10 of the transistor consisting of the emitter region E, the base region B and the collector region C is forward-biased, the minority carriers are injected in these regions. In this case the minority carrier densities are indicated by the solid lines in FIG. 3(*a*). That is, the curved line 12 indicates the minority carrier density in the base region B while the curved line 13 indicates the minority carrier density in the collector region C. The minority carriers injected in these regions B and C may remain as the stored minority carriers even after the forward-bias is removed, but will be decreased as indicated by the broken lines in FIG. 3(*a*). After the time interval called "lifetime of minority carrier," the minority carrier density in both regions becomes substantially zero. However, when the reverse-bias is applied across the collector junction 10 during the time the stored minority carriers still exist, the reverse current flows. Due to this reverse current, the stored minority carriers disappear in a time shorter than the lifetime of minority carrier, and once the minority carriers disappear, no current will flow with the reverse bias. Therefore when the information or binary numerals 1 and 0 are represented by whether the minority carriers are stored or not, the PN junction may be used as a temporary memory which may hold its memory state 1 or 0 for the lifetime of minority carrier or a time shorter than this lifetime.

Next after the minority carriers have injected into the PN junction region as indicated by the solid lines in FIG. 3(*a*) by flowing the forward-current to the collector junction 10, the bias voltage is applied between the collector region C and the emitter region E so that the emitter junction 11 may be forward-biased. In this case, as far as the stored minority carriers remain in the base region B, the collector junction 10 remains in the conduction state so that the bias applied between the collector and emitter regions is almost applied across the emitter junction 11. This bias voltage is also applied to the emitter junction 11 as the forward-bias so that the forward current flows in the emitter region E. Therefore as shown by the solid curve 14 in FIG. 3(*b*), the minority carrier density in the base region B is increased. This current is due to the minority carriers injected from the emitter junction 11 so that the density of stored minority carriers injected from the collector junction 10 will not change appreciably by the emitter current. Therefore the minority carriers disappear in a time interval almost equal to the lifetime of minority carrier as indicated by the dashed curves shown in FIG. 3(*b*). When the minority carriers disappear, the collector junction 10 becomes non-conductive so that the voltage applied between the collector and emitter regions becomes a reverse bias which is applied across the collector junction 10. Consequently the emitter junction 11 is not forward biased so that no emitter current may flow. In this case, it should be noted that the emitter current is controlled by the presence or absence of the stored minority carriers, but most of the stored minority carriers are not consumed by the emitter current. Therefore it is seen that the effect of the storage of minority carriers may be used for nonvolatile readout of the content stored in the temporary storage or memory element. Furthermore the shift or transfer of the stored minority carriers may be accomplished from one transistor to another without impairing the minority carrier storage effect in said one transistor by the emitter current of said one transistor which is controlled depending upon whether the minority carriers are stored or not, and flows into said another transistor.

Figure 4:
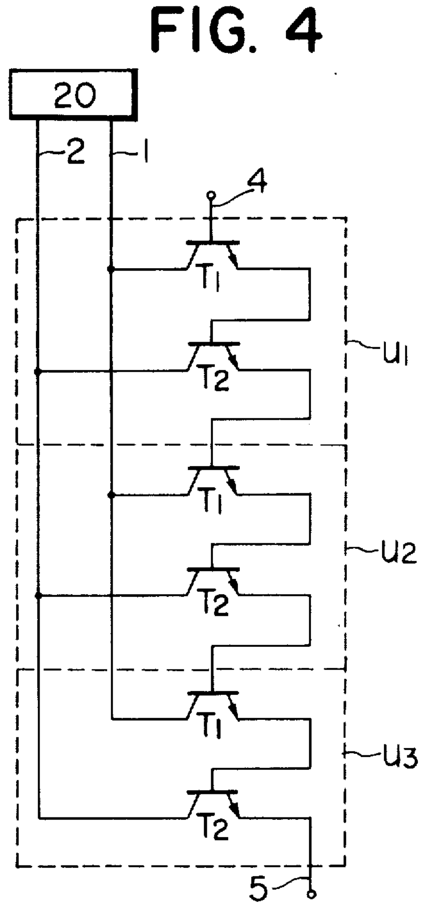
FIG. 4 is a circuit diagram illustrating a first embodiment of a dynamic shift register in accordance with the present invention.

In FIG. 4 is illustrated the first embodiment of a dynamic shift register in accordance with the present invention in which only three unit circuits $U_1$, $U_2$ and $U_3$ are shown for simplicity, and each unit circuit comprises two NPN transistors $T_1$ and $T_2$. The signal source 20 supplies alternating voltage between feeder lines 1 and 2. The collectors of the transistors $T_1$ and $T_2$ for the storage of minority carriers in each unit circuit are connected to the feeder lines 1 and 2 respectively, and the emitter of the transistor $T_1$ is connected to the base of the transistor $T_2$. The base of the transistor $T_1$ is the input terminal while the emitter of the transistor $T_2$ is the output terminal. In the instant embodiment, the base of the transistor $T_1$ in the unit circuit $U_1$ is used as the information input terminal 4 and the emitter of the transistor $T_2$ in the unit circuit $U_3$ is used as the output terminal 5 of the dynamic shift register.

Figure 5:
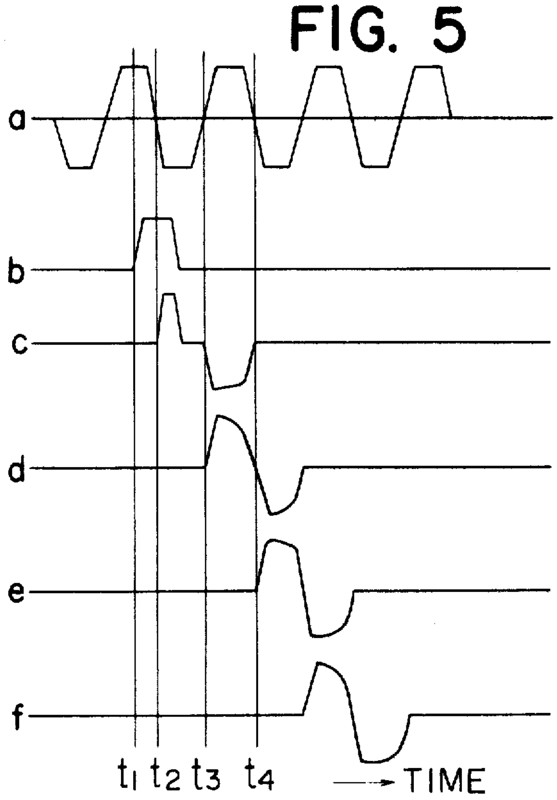
FIG. 5 illustrates waveforms at various points in the dynamic shift register shown in FIG. 4.

In FIG. 5 are illustrated waveforms of various points in the circuit shown in FIG. 4. The voltage waveform supplied from the source 20 between the feeder lines 1 and 2 is indicated in FIG. 5(*a*) and is the voltage on the feeder line 1 relative to the voltage on the feeder line 2. When the trigger pulse shown in FIG. 5(*b*) is applied to the input terminal 4 at the time $t_1$, the forward current flows across the collector junction of the transistor $T_1$ in the unit circuit $U_1$ from the time $t_2$ the voltage supplied on the feeder line 1 becomes negative relative to the voltage supplied on the feeder line 2 until the trigger pulse disappears, so that the minority carriers are injected into and stored in the collector junction region; and then, the trigger pulse becomes zero. At the time $t_3$, the voltage supplied on the feeder line 1 becomes positive relative to the voltage supplied on the feeder line 2 and while the minority carriers remainn in the transistor $T_1$, the forward bias it applied to the emitter junction of the transistor $T_1$ and to the collector junction of the transistor $T_2$ so that the currents flow through these transistors $T_1$ and $T_2$ from the feeder line 1 to the feeder line 2. After a time interval substantially equal to the lifetime of minority carrier, the minority carriers stored in the transistor $T_1$ almost disappear so that the transistor $T_1$ will not conduct the current in either direction. However, as the minority carriers are injected into and stored in the collector junction of the transistor $T_2$, at the time $t_4$ when the voltage supplied on the feeder line 1 becomes negative to the voltage supplied on the feeder line 2, the forward bias is applied to the emitter junction of the transistor $T_2$, and as far as the stored minority carriers remain in the transistor $T_2$, the current flows from the feeder line 2 to the feeder line 1 through the transistor $T_2$ in the unit circuit $U_1$ and through the transistor $T_1$ in the unit circuit $U_2$, and the minority carriers are stored in the transistor $T_1$ in the unit circuit $U_2$. Thus in the similar manner in one half cycle of the alternating voltage applied between the feeder lines 1 and 2 the transistor which stores the minority carriers in each unit circuit shifts from transistor $T_1$ to $T_2$, and in each cycle of the alternative voltages the unit circuit which stores the minority carriers is shifted to the next digit unit circuit. FIGS. 5(*c*)–(*f*) show the collector current waveforms of the transistors $T_1$ and $T_2$ in the unit circuits $U_1$ and $U_2$ respectively, the current flowing out of the collector being positive.

In order to drive an external circuit by the dynamic shift register of the present invention described hereinbefore, the base and emitter of a transistor in the external circuit or a resistor is inserted between the feeder line and the collector of the transistor, between the emitter of the transistor $T_1$ and the base of the transistor $T_2$ in the same unit circuit or between the base and collector of the transistor as will be described in more detail hereinafter so that whether the current flows through each unit circuit or not may be detected to thereby scan the external circuit.

A common resistor may be inserted in order to limit the current from the source or a resistor for limiting the current may be inserted in each unit circuit. The voltage supplied from the power source may be the rectangular, square trapezoidal or sinusoidal waveforms, and the magnitude of the voltage to be applied may be of the order of 1.5 times the junction voltage in both directions. The alternating period may be of the order of the lifetime of minority carrier of a transistor used, and the dynamic shift register of the present invention may be operated over a wide speed range by controlling the magnitude of current, making asymmetrical the magnitudes and durations of current in both directions or increasing the leakage current between the base and collector of a transistor.

Instead of the power source 20, the zero and positive voltages may be periodically and complementarily supplied on the feeder lines 1 and 2 respectively as in the cases of the prior art dynamic shift registers described hereinbefore with reference to FIGS. 1 and 2. That is, the positive pulse voltage is supplied on the feeder line 1 at a time $t_1$ shown in FIG. 5(*a*) when the alternating voltage source is positive while the zero pulse voltage is supplied on the feeder line 2. On the other hand, the positive pulse voltage is supplied on the feeder line 2 while the zero voltage is supplied on the feeder line 1 at a time interval the voltage supplied from the source is negative.

According to the experiments conducted by the inventors in which the transistors $T_1$ and $T_2$ were 2SC33, it was confirmed that the transfer or shift of the minority carriers occurs when the period of the power source is 2–4 microseconds so that the dynamic shift register of the present invention can perfectly accomplish its functions.

Figure 6:
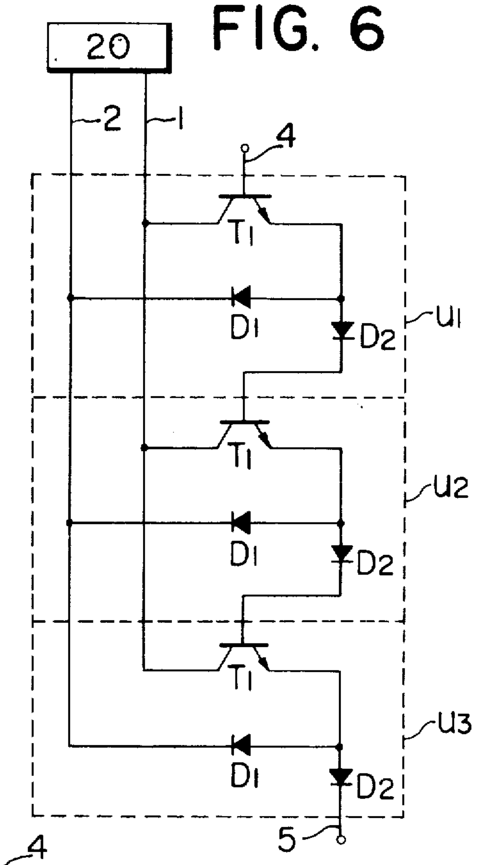
FIGS. 6–9 are circuit diagrams of a second, third, fourth and fifth embodiments of the present invention respectively.

In FIG. 6 is illustrated the second embodiment of the present invention similar to the first embodiment described above with reference to FIG. 4 except that instead of the transistors $T_2$ in the unit circuits $U_1$, $U_2$ and $U_3$, diodes $D_1$ and $d_2$ are used. The collector of each transistor $T_1$ in each unit circuit is connected to the feeder line 1, and the emitter thereof is connected D the anodes of the diodes $D_1$ and $D_2$, the cathodes of which in turn are connected to the feeder line 2 and the output terminal respectively. The base 4 of the transistor $T_1$ in the unit circuit $U_1$ is used as the input terminal of this dynamic shift register. It is preferable that the minority carrier storage effect of the diode $D_2$ is less than that of the diode $D_1$. For example the diodes $D_2$ have a PN junction with a shorter lifetime of minority carrier or may be of Schottky barrier diode type.

When the voltage is applied across the feeder lines 1 and 2 in such a manner that the emitter junction of the transistor $T_1$ is forward biased before the stored minority carriers injected from the collector junction of the transistor $T_1$ still remain, both of the emitter junction of the transistor $T_1$ and the PN junction of the diode $D_1$ are forward-biased so that as far as the stored minority carriers remain in the transistor $T_1$, the current flows from the feeder line 1 to the feeder line 2 through the transistor $T_1$ and the diode $D_1$. When the minority carriers stored in the transistor $T_1$ in the unit circuit $U_1$ disappear, no current flows, but the minority carriers injected are stored in the diode $D_1$. When the polarity of the voltage between the feeder lines 1 and 2 is such that the collector junction of the transistor $T_1$ is forward-biased, both of the junction of the diode $D_2$ in the unit circuit $U_1$ and the collector junction of the transistor $T_1$ in the unit circuit $U_2$ are forwardbiased so that the current flows from the feeder line 2 to the feeder line 1 through the diodes $D_1$ and $D_2$ in the unit circuit $U_1$ and the transistor $T_1$ in the unit circuit $U_2$. In this case, the reverse current flows into the diode $D_1$ in the unit circuit $U_1$ so that the stored minority carriers disappear in a very short time as compared with the lifetime of minority carrier, and no more current flows. This short time interval may be adjusted by suitably selecting the magnitude of current. Next when the polarity of the voltage between the feeder lines 1 and 2 is so selected that the emitter junction of the transistor $T_1$ in the unit circuit $U_2$ may be forward-biased, the emitter junction of this transistor $T_1$ and the junction of the diode $D_1$ in the unit circuit $U_2$ are forward-biased so that the current flows from the feeder 1 to the feeder line 2 through the transistor $T_1$ and the diode $D_1$ in the unit circuit $U_2$. In this case it is preferable to use the diodes $D_2$ whose minority carrier storage effect is less so that the current flow through the transistor $T_1$ in the unit circuit $U_2$ and through the diodes $D_1$ and $D_2$ in the unit circuit $U_1$ may be interrupted. In the similar manner to that described hereinbefore, the shift of the minority carriers is accomplished, and as in the case of the first embodiment described with reference to FIG. 4, the load resistors for limiting the current, the resistors for detecting the current flow and the emitter junctions of the third transistors may be inserted as needs demand. However in the instant embodiment the emitter junction of a transistor in an external circuit to be driven may be used as the diode $D_1$ in the unit circuit $U_1$. The period of the power source may be suitably selected in a similar manner described with reference to FIG. 4.

According to the results of the experiments conducted by the inventors using the 2SC33 transistors $T_1$ with their bases as the diodes $D_1$ and the 1S731 diodes $D_2$, it was confirmed that the operation of the dynamic shift register of the present invention was satisfactory with the use of the alternating voltage of the period from two to four microseconds. In the second embodiment where the diodes are used, the time interval of the stored minor carriers remaining becomes shorter depending upon the magnitude of current used so that a suitable magnitude of current must be selected and the frequency of the alternating voltage must be increased. However, in the first embodiment described with reference to FIG. 4 the transistors are used so that the decrease in the minority carriers is dependent upon the lifetime thereof, not dependent upon the magnitude of current used. Therefore in the first embodiment, the magnitude of current used may be increased while the frequency may be decreased.

Figure 7:
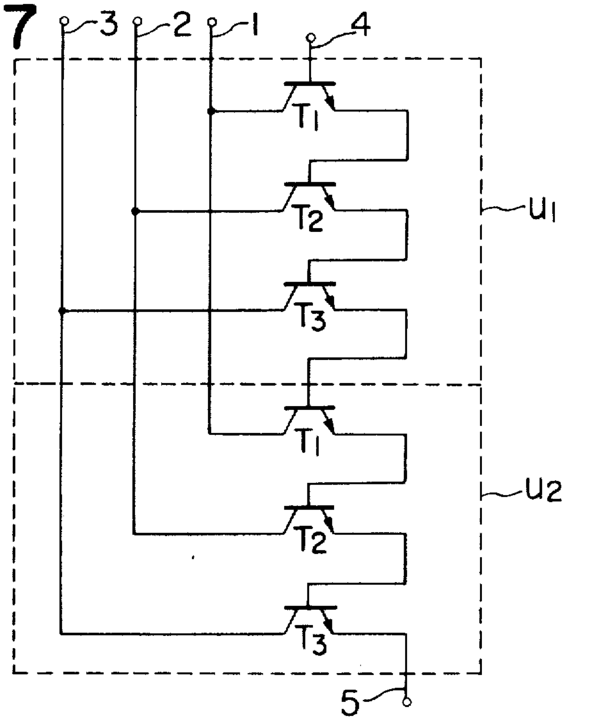

In FIG. 7 is illustrated the third embodiment of the present invention as comprising, for simplicity, two unit circuits $U_1$ and $U_2$. Each of these unit circuits $U_1$ and $U_2$ comprises three transistors $T_1$, $T_2$ and $T_3$ whose collectors are connected to the feeder lines 1, 2 and 3 respectively. The three-phase pulse voltages are supplied on the feeder lines 1, 2 and 3. That is, in the first one-third cycle, the positive voltage is applied only to the first feeder line 1 while the zero voltage is applied to the second and third feeder lines 2 and 3. In the second one-third cycle, the positive voltage is applied only to the second feeder line 2 while the zero voltage is applied to the first and third feeder lines 1 and 3. In the third one-third cycle the positive voltage is applied only to the third feeder line 3 while the zero voltage is applied to the first and second feeder lines 1 and 2. As in the case of the first embodiment, the base of the transistor $T_1$ in the unit circuit $U_1$ is the input terminal and the emitter of the transistor $T_3$ is used as the output terminal of the unit circuit $U_1$. The emitter of the transistor $T_1$ is connected to the base of the transistor $T_2$ while the emitter of the second transistor $T_2$ is connected to the base of the third transistor $T_3$ in each unit circuit $U_1$. Such unit circuits are connected in series in such a manner that the output terminal of one unit circuit is connected to the input terminal of the next unit circuit. Thus, in the third embodiment shown in FIG. 7, the base of the first transistor $T_1$ in the unit circuit $U_1$ is used as the input terminal 4 of the dynamic shift register while the output terminal or the emitter of the transistor $T_3$ in the unit circuit $U_2$ is used as the output terminal 5 of the dynamic shift register.

The mode of operation of the dynamic shift register of the third embodiment is substantially similar to that of the first embodiment shown in FIG. 4. When the trigger voltage is applied to the input terminal 4 when the zero voltage is supplied on the feeder line 1, the current flows across the collector junction of the transistor $T_1$ in the unit circuit $U_1$ and the minority carriers are stored therein. When the positive voltage is supplied on the feeder line 1, the current which is controlled by these stored minority carriers flows from the feeder lines 1 to 2, and the current flows into the collector junction of the transistor $T_2$ so that the minority carriers are stored therein. Next when the positive voltage is supplied on the feeder line 2 the current flows from the feeder line 2 to the feeder line 3, and the minority carriers are stored in the collector junction of the transistor $T_3$. In the manner similar to that described above the stored minority carriers are shifted from one transistor to another as the positive voltage is supplied on the feeder line 1, 2 or 3 in the manner described above.

In the third embodiment described above with reference to FIG. 7, there is a defect that the number of component parts in each unit circuit and the number of feeder lines are increased, but there is an advantage that each transistor may have an idle or inoperative time of one-third cycle even when the trigger pulses are successively applied and when it is required for the transistor to start the storage of minority carriers immediately after it has discharged the stored minority carriers so that each transistor may start the storage of minority carriers after a sufficient recovery time. Therefore the operation of the dynamic shift register may be sufficiently stabilized.

Figure 8:
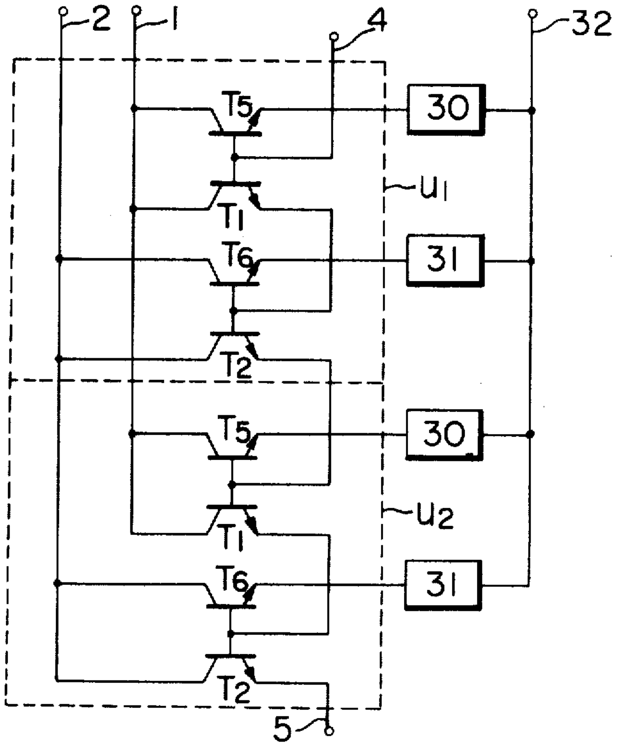

In FIG. 8 is illustrated the fourth embodiment of the present invention which is substantially similar to the first embodiment described with reference to FIG. 4 except that additional transistors $T_5$ and $T_6$ are added in each unit circuit so that external circuits may be driven. In each of the unit circuits $U_1$ and $U_2$, the transistors $T_1$ and $T_2$ are connected to the feeder lines in the manner similar to that described in the first embodiment (See FIG. 4). The base and collector of the driving transistor $T_5$ are connected to the base and collector of the transistor $T_1$ respectively, and the emitter of the transistor $T_5$ is connected to a feeder line 32 through an external circuit 30 to be driven. In the similar manner, the base and collector of the other driving transistor $T_6$ are connected to those of the transistor $T_2$, and the emitter of the transistor $T_6$ is connected to the feeder line 32 through an external circuit 31 to be driven. As in the case of the first embodiment (See FIG. 4), the positive and zero voltages are periodically applied to the feeder lines 1 and 2 respectively in a complementary manner. That is, when the positive voltage is supplied on the feeder line 1, the zero voltage is supplied on the feeder line 2 while when the zero voltage is applied on the feeder line 1, the positive voltage is supplied on the feeder line 2. The operations of the transistors $T_1$ and $T_2$ in the first embodiment. In the instant embodiment, when the current flows across the collector junction of the transistor $T_1$, the current also flows across the collector junction of the driving transistor $T_5$ so that the driving current may be flown from the feeder line 32 through the external circuit 30 to the feeder line 1. Next when the current due to the minority carriers stored in the transistor $T_1$ flows across the collector junction of the transistor $T_2$, the driving current due to the minority carriers stored in the transistor $T_5$ may flow from the feeder line 1 through the external circuit 30 to the feeder line 37. In this case, the current flows simultaneously across the collector junction of the transistor $T_6$ so that the driving current may flow through the external circuit 31 from the feeder line 32 to the feeder line 1. When the zero voltage is supplied on the feeder line 32, only the current flow from the feeder line 1 to the feeder line 32 may be permitted, so that the instant embodiment is of a scanning drive circuit type. The external circuits 30 and 31 are, for example, diodes or resistors. In an arrangement in which the positive and negative voltages are supplied on the feeder lines 1 and 2 in the manner described above, and the application of continuous trigger pulses to the input terminal 4 is prohibited so that it will not be required to store the minority carriers immediately after each of the transistors has discharged the stored minority carriers, both of the external circuits 30 and 31 may be driven by the single unit circuit of the type shown in FIG. 8. Under the same operating conditions, each unit circuit may be constituted by one half of the unit circuit shown in FIG. 8. Therefore each unit circuit may comprise only two component parts.

Figure 9:
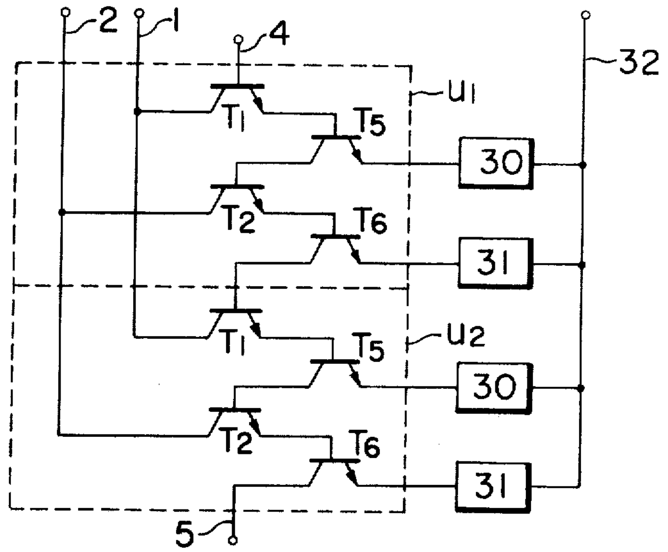

In FIG. 9 is illustrated the fifth embodiment of the present invention similar to the first embodiment described with reference to FIG. 4, in which additional transistors $T_5$ and $T_6$ are inserted in each unit circuit in order to satisfactorily drive external circuits. Parts similar to those in FIG. 8 are designated by same reference numerals in FIG. 9. The transistors $T_1$ and $T_2$ are connected to the feeder lines 1 and 2 in the manner described with reference to FIG. 4. In each of the unit circuits $U_1$ and $U_2$ between the emitter of the transistor $T_1$ and the base of the transistor $T_2$ is interconnected the base-collector junction of the driving transistor $T_5$, the emitter of which is connected to the feeder line 32 through an external circuit 30. Similarly, the base-collector junction of the other driving transistor $T_6$ is interconnected between the emitter of the transistor $T_2$ and the output terminal of the unit circuit $U_1$ or the base of the transistor $T_1$ in the unit circuit $U_2$. The emitter of the transistor $T_6$ is connected to the feeder line 32 through an external circuit 31.

The zero and positive voltages are alternately supplied on the feeder lines 1 and 2 in the manner described with reference to FIG. 4. When the trigger pulse is applied to the input terminal 4, the transistors $T_1$ and $T_2$ in each of the unit circuits $U_1$ and $U_2$ function in the similar manner described with reference to FIG. 4. In this case, when the current due to the minority carriers stored in the transistor $T_1$ flows across the collector junction of the transistor $T_2$ when the positive voltage is supplied on the feeder line 32, the current may flow from the feeder line 32 through the external circuit 30 to the feeder line 2 due to the reverse-current amplification factor of the transistor $T_5$. The reverse-current amplification factor is normally unity or less than unity so that the driving current flowing from the feeder line 32 into the feeder line 2 or 1 through the external circuit 30 or 31 will not affect the shift register actions of the transistors $T_1$ and $T_2$ described with reference to FIG. 4. Therefore it should be noted that the driving transistors $T_5$ and $T_6$ are different in arrangement and function from the emitter-follower transistors $T_3$ and $T_4$ which are used for current amplification in the prior art shown in FIG. 1.

As in the case of the fourth embodiment, when the continuous application to the input terminal 4 of the trigger pulses is inhibited so that it will be not required for each of the transistors $T_1$ and $T_4$ to store the minority carriers immediately after it has discharged the stored minority carriers, each unit circuit in FIG. 9 may drive the two external circuits 30 and 31 simultaneously. In other words, one half unit circuit may constitute one unit circuit so that each unit circuit may comprises only two component parts.

The fourth and fifth embodiments described above with reference to FIGS. 8 and 9 are used for driving the external circuits with a driving current greater than a predetermined level, but it should be noted that if a large magnitude of driving current is not required, the emitters of the transistors $T_1$ and $T_2$ in each unit circuit may be directly connected to the external circuits 30 and 31 respectively.

In all of the embodiments described above, the transistors have been shown as being NPN transistors while the diodes, as being the diodes with an anode made of the p-type region and a cathode made of the n-type region, but it will be understood that the pnp transistors and the diodes with an anode made of the n-type region and a cathode made of the p-type region may be used.

What is claimed is:

1. A dynamic shift register comprising first and second feeder lines, a source of voltage connected to apply alternating voltages having first and second levels in a complementary manner, to said first and second feeder lines and a plurality of unitcircuits each comprising first and second transistors for storage of minority carriers, the collectors of said first and second transistors being connected to said first and second feeder lines respectively, means connecting the emitter of said first transistor to the base of said second transistor, said connecting means consisting of a direct current path free of direct current connections to said first feeder line external of said source and free of interconnection other than to said transistors with direct current voltage levels that affect the shift of minority carriers from said first to said second transistors, the base of said first transistor being used as an information input terminal and the emitter of said second transistor being used as an output terminal, whereby when said first voltage level is applied to said first feeder line while said second voltage level is applied to said second feeder line, the current flows across the collector junction of said first transistor in response to the signal applied to said input terminal, thereby storing the minority carriers in said collector junction region, when said second voltage level is applied to said first feeder line while said first voltage level is applied to said second feeder line, the current which is controlled depending upon whether the minority carriers are stored in said first transistor or not flows across the collector junction of said second transistor, thereby shifting the storage of minority carriers into the collector junction region of said second transistor, and when said first voltage level is applied to said first feeder line while said second voltage level is applied to said second feeder line, said minority carrier stored in said second transistor is shifted through said output terminal to the next unit circuit thus shifting the information represented by the storage of minority carriers from one unit circuit to the next unit circuit.

2. A dynamic shift register as set forth in claim 1 wherein said connecting means comprises a third transistor, a third feeder line, the emitter of said first transistor being connected to the base of said third transistor whose collector is connected to said third feeder line, the emitter of said third transistor being connected to the base of said second transistor, said source comprising a source of a three-phase voltage having the separate phases connected to said first, second and third feeder lines.

3. A dynamic shift register stage, comprising first and second feeder lines, means for applying first and second alternating voltages having first and second levels to said first and second feeder lines respectively in a complementary manner, an input terminal, an output terminal, a transistor having a collector connected to said first line and a base connected to said input terminal whereby minority carriers are stored in the collector junction of said transistor in response to a signal on said input terminal, semi-conductor means having first and second diodes, a direct current path between the emitter of said transistor and a first pair of like electrodes of said first and second diodes, said direct current path being free of direct current connections to said first line external of said means applying said alternating voltages to said first and second lines and free of interconnection other than by way of said transistor and diodes with direct current voltage levels that affect a shift of said minority carriers between said first and second transistors due to said alternating voltages, the other electrode of said first diode being connected to said second line, means connecting the other electrode of said second diode to said output terminal.

4. The shift register of claim 3 wherein said semiconductor means is a second transistor, with said first diode comprising a base-collector diode of said second transistor.

5. The shift register of claim 3 wherein said first and second diodes are pn junction diodes, and the minority carrier storage effect of said second diode is less than that of said first diode.

6. The shift register of claim 3 wherein said pair of electrodes are the anodes of said diodes.

7. The dynamic shift register stage of claim 3 wherein said first and second diodes are comprised of first and second pn junction diodes, said second diode having a minority carrier storage effect less than that of said first diode, the anodes of said first and second diodes comprising said like electrodes.

8. A dynamic shift register stage, comprising first and second feeder lines, means for applying first and second alternating voltages having first and second levels to said first and second feeder lines respectively in a complementary manner, an input terminal, an output terminal, a transistor having a collector connected to said first line and a base connected to said input terminal, semi-conductor means having first and second diode means, a direct current connection between the emitter of said transistor and a first pair of like electrodes of said first and second diodes and constituting the sole direct current connection to said emitter, the other electrode of said first diode being connected to said second line, means connecting the other electrode of said second diode to said output terminal, whereby aside from said direct current connection between said emitter and said first pair of like electrodes said emitter is otherwise unconnected with respect to voltage levels that substantially affect currents in said direct current connection for said shift register stage.

9. In a dynamic shift register of the type having first and second feeder lines, means for applying an alternating voltage between said first and second feeder lines whereby the voltage between said feeder lines alternates between first and second voltage levels, said shift register including register stages each having an input line, an output line, a transistor having a collector connected to said first line and a base connected to said input line, whereby minority carriers are stored in the collector junction of said transistor in response to an input signal on said input line, first and second diode means, a DC connection between the emitter of said transistor and like polarity electrodes of said diode means, whereby minority carriers are transferred to the junction of said first diode means in response to said alternating voltage, and means connecting the other electrodes of said diode means to said second feeder line and said output line respectively; the improvement wherein said DC connection comprises the sole connection to said emitter and said like polarity electrodes of said diode means.

10. In a dynamic shift register of the type having first and second feeder lines, means for applying an alternating voltage between said first and second feeder lines whereby the voltage between said feeder lines alternates between first and second voltage levels, said shift register including register stages each having an input line, an output line, a transistor having a collector connected to said first line and a base connected to said input line, whereby minority carriers are stored in the collector junction of said transistor in response to input signals on said input line, first and second diode means, a DC connection between the emitter of said transistor and like polarity electrodes of said diode means, whereby said minority carriers are transferred to the junction of said first diode means in response to said alternating voltage, and means connecting the other electrodes of said diode means to said second feeder line and output line respectively; the improvement wherein said shift register further comprises a third feeder line, wherein said DC connection comprises a second transistor having a base connected to the emitter of said first mentioned transistor, and a collector connected to said like electrodes of said diode means, said stage further comprising an output device connected between said third feeder line and the emitter of said second transistor, said second transistor comprising the sole connection to the emitter of said first mentioned transistor and said like electrodes of said diode means.

11. In a dynamic shift register of the type having first and second feeder lines, means for applying an alternating voltage between said first and second feeder lines whereby the voltage between said feeder lines alternates between first and second voltage levels, said shift register including register stages each having an input line, an output line, a transistor having a collector connected to said first line and a base connected to said input line, whereby minority carriers are stored in the collector junction of said transistor in response to input signals on said input line, first and second diode means, a DC connection between the emitter of said transistor and like polarity electrodes of said diode means, whereby said minority carriers are transferred to the junction of said first diode means in response to said alternating voltage, and means connecting the other electrodes of said diode means to said second feeder line and said output line respectively; the improvement wherein said shift register further comprises a third feeder line, a second transistor having a base connected to the emitter of said first mentioned transistor, and a collector connected to said second feeder line, and an output device connected between the emitter of said second transistor and said third feeder line, the base of said second transistor comprising the sole connection to said DC connection aside from said like electrodes and the emitter of said first mentioned transistor.

* * * * *

UNITED STATES PATENT OFFICE
CERTIFICATE OF CORRECTION

Patent No. 3,894,248 Dated July 8, 1975

Inventor(s) Takashi Asaoka

It is certified that error appears in the above-identified patent and that said Letters Patent are hereby corrected as shown below:

On the Title Page under "Foreign Application Priority Data" please change the Japanese patent application No. from "46-60261" to --46-40261--.

On column 13, line 36: Change "unitcircuits" to --unit circuits--.

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*